No. 692,642. Patented Feb. 4, 1902.
O. EISENHUTH.
PIPE COUPLING.
(Application filed Apr. 22, 1901.)
(No Model.)
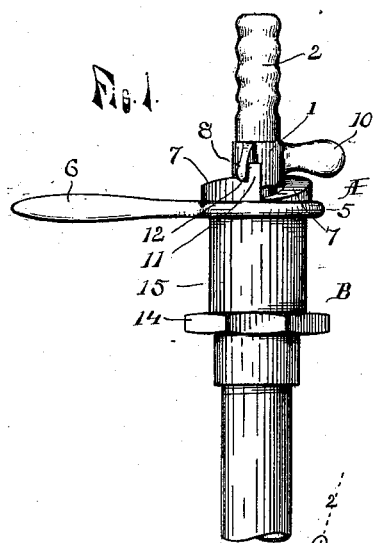
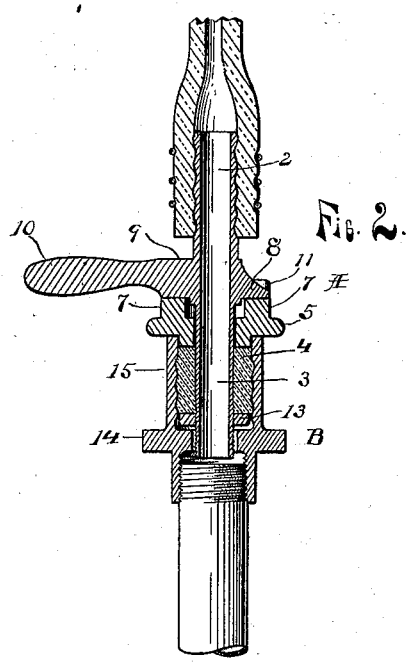
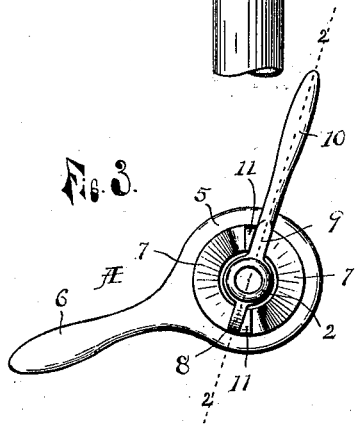
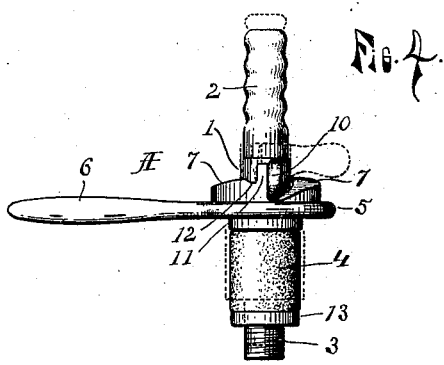
WITNESSES.
INVENTOR.
Oscar Eisenhuth
Attorneys.

UNITED STATES PATENT OFFICE.

OSCAR EISENHUTH, OF DETROIT, MICHIGAN, ASSIGNOR TO C. F. HEYERMAN, OF DETROIT, MICHIGAN.

PIPE-COUPLING.

SPECIFICATION forming part of Letters Patent No. 692,642, dated February 4, 1902.

Application filed April 22, 1901. Serial No. 56,885. (No model.)

*To all whom it may concern:*

Be it known that I, OSCAR EISENHUTH, a citizen of the United States of America, residing at Detroit, in the county of Wayne and State of Michigan, have invented certain new and useful Improvements in Pipe-Couplings, of which the following is a specification, reference being had therein to the accompanying drawings.

My invention relates to improvements in couplings for pipes and similar conduits for liquids and also to connections for attaching such conduits to a source of supply; and its object is to provide a device in which the connection depends entirely upon frictional contact and which may be used by slightly modifying the construction to couple pipe-sections, a hose to a pipe-section, or a hose or pipe to a barrel or other source of liquid-supply, the essential features being to provide a coupling member having a central tube with a packing-ring and means for expanding said ring laterally to attach the said member to the opposing member, to a pipe-section, or within the bung-hole of the barrel.

The device shown in the accompanying drawings is a half-hose coupling adapted for use in connection with beer-taps and the like where it is desired to attach a hose to a pipe-section in such a manner that it may be readily coupled or uncoupled and yet make a tight joint which will not become loosened while in use; but the device may be adapted to use as a hose-coupling by providing each member with a nipple and omitting the operating-handles shown, or when it is desired to attach a hose to a barrel or other source of liquid-supply the male member of the device only is used, the packing-ring being expanded to secure it within the opening into which it is inserted, as will more fully appear from the accompanying drawings, in which—

Figure 1 is a side elevation of a device embodying my invention. Fig. 2 is a vertical section of the same on the line 2 2 of Fig. 3. Fig. 3 is a plan view of the same; Fig. 4, a side elevation of the male member detached.

A is the male and B the female member of the coupling. The member A is provided with a head 1, from which head are an upwardly-extended nipple 2 for the attachment of the hose and a downwardly-extended tube 3, upon which is sleeved a rubber packing-ring 4, held thereon by a suitable nut 13. A washer 5 is also sleeved upon said tube between said packing-ring and said head and provided with a handle 6 and upwardly-extended flanges forming inclines 7, which inclines are engaged by lugs 8 and 9 on the head 1, the lug 9 being extended to form a handle 10. At the high end of each incline is provided a stop 11 for the lugs 8 and 9, and adjacent to these stops the inclines are cut away or grooved at 12 to receive said lugs.

The member B of the coupling consists of the head 14, having the downwardly-extended and internally-screw-threaded socket for the attachment of a pipe and an upwardly-extended and internally-corrugated sleeve 15 to receive the packing-ring 4, which ring when so inserted in said sleeve is expanded to engage said corrugations by turning the washer 5 upon the tube 3. This movement will force the lugs 8 and 9 to traverse the inclines 7, thus forcing the washer 5 toward the packing-ring and compressing the same endwise between said washer and the nut 13 and causing said packing to expand laterally, as shown in dotted lines in Fig. 4. When the said washer is turned so that the stops 11 contact the lugs 8 and 9, said lugs drop into the groove 12, and the parts are prevented from being turned when in use by the twisting of the hose or similar cause. It will thus be seen that the parts are quickly and firmly coupled together by simply inserting the packing-ring in the sleeve and turning the handles a short distance, the packing serving the double purpose of making a tight joint and connecting the members.

Where the device is used as a hose-coupling, I provide each member with a nipple, and in place of the handles 6 and 10 I provide the parts with hexagonal heads, and when it is desired to use the device for attaching a hose to a barrel or similar purpose the use of the female member B may be dispensed with and the packing-ring inserted within the bung-hole, the expansion of the said ring being sufficient to hold the member within the opening and at the same time form a tight connection, preventing all leakage.

I expand the rubber packing by compressing the same endwise, thus making it more solid to withstand the wear, and by using the expansion of the rubber packing-ring to connect the parts I dispense with all screw connections or other interlocking metallic parts and at the same time insure a tight joint, thus providing a coupling which is much more readily and quickly connected than when such connections or parts are used.

What I claim as my invention is—

1. In a coupling, the combination of a member provided with a central tube, a packing-ring on said tube, a washer on said tube, and means for moving said washer longitudinally on said tube to compress said packing-ring endwise and expand the same laterally; and a member adapted to receive said member and to be engaged by said packing-ring.

2. In a coupling, in combination, a member consisting of a central tube, a packing-ring on said tube, a washer longitudinally movable on said tube, inclines on said washer, and lugs on said tube to engage said inclines; and a member provided with a sleeve to receive said member.

3. In a coupling, the combination of two coupling members, one provided with a central tube having one end formed into a nipple, a packing-ring on said tube, a washer longitudinally movable on said tube, inclines on said washer, stops and grooves at the upper ends of said inclines, lugs on said tube to engage said inclines, and a handle on said washer; and the other member provided with a sleeve adapted to be engaged by said packing-ring.

4. In a pipe-coupling, a coupling member having a head, an internally-screw-threaded socket extending downward from said head to receive a pipe-section, and an internally-corrugated sleeve extending upward therefrom, and a second coupling member having a head, a nipple extending upward therefrom, a tube extending downward therefrom, lugs and a handle on said head, a nut on said tube near the lower end, a packing-ring sleeved on said tube and held thereon by said nut, a washer on said tube, a handle on said washer, upwardly-extended inclines on said washer adapted to engage the said lugs, and stops and grooves at the upper ends of said inclines.

In testimony whereof I affix my signature in presence of two witnesses.

OSCAR EISENHUTH.

Witnesses:
OTTO F. BARTHEL,
MAX ESCHRICH.